United States Patent
Mine et al.

[19]

[11] Patent Number: 5,863,248
[45] Date of Patent: Jan. 26, 1999

[54] IMAGE PROCESSING METHOD AND IMAGE PROCESSING DEVICE

[75] Inventors: Yuichiro Mine; Takayuki Yanagihori, both of Tokyo, Japan

[73] Assignee: Sega Enterprises, Ltd., Tokyo, Japan

[21] Appl. No.: 714,136

[22] PCT Filed: Jan. 19, 1996

[86] PCT No.: PCT/JP96/00085

§ 371 Date: Dec. 4, 1996

§ 102(e) Date: Dec. 4, 1996

[87] PCT Pub. No.: WO96/22581

PCT Pub. Date: Jul. 25, 1996

[30] Foreign Application Priority Data

Jan. 19, 1995 [JP] Japan ..................... 7-006710
Jan. 19, 1995 [JP] Japan ..................... 7-006711

[51] Int. Cl.$^6$ ........................................... A63F 9/24
[52] U.S. Cl. ................................. 463/4; 463/31
[58] Field of Search .................. 463/1–4, 7, 30–31, 463/36; 364/410; 273/108.1, 108.4, 461, 460

[56] References Cited

FOREIGN PATENT DOCUMENTS 6-165876 6/1994 Japan .
7-281659 10/1995 Japan .
WO96/22581 7/1996 Japan .

OTHER PUBLICATIONS

Translated copy of the International Search Report issued by the Japanese Patent Office for PCT/JP96/00085 (1 page).

*Primary Examiner*—Jessica Harrison
*Assistant Examiner*—Mark A. Sager
*Attorney, Agent, or Firm*—Dickstein, Shapiro, Morin & Oshinsky, LLP

[57] ABSTRACT

Respective ball directions from respective players to the ball B are computed, based on display coordinates of the respective players P and coordinates of the ball B. An input direction is computed based on input information from a cross key 18. The respective ball directions and the input direction are compared with each other to select a player P whose ball direction is in a prescribed range based on an opposite direction to the input direction. A game player can arbitrarily select a player, and the selected player is never moved in unintended direction. Player directions from the ball B to players P are computed based on display coordinates of the players P and coordinates of the ball B. An input direction is computed based on input information from a cross key 18. When an offset angle between the player direction and the input direction is in a prescribed range, the player P is moved in the input direction by the cross key 18. The players can be moved as intended by simple operation.

40 Claims, 12 Drawing Sheets

IMAGE PROCESSING METHOD AND IMAGE PROCESSING DEVICE

TECHNICAL FIELD

The present invention relates to an image processing method and an image processing device for selecting one of a plurality of objects-to-be-moved displayed on a screen, and changing an input direction for moving the selected object-to-be-moved in an optimum direction on the screen.

BACKGROUND ART

When playing a sports game that is played using a display device, such as a CRT or others, it is general that backgrounds and players used in making the sports game are displayed on the screen. A game player operates movements of the players displayed on the screen by outside input means, such as a control pad or others, to advance the sports game.

In a sports game in which the match is, in most cases, played by singles, it is not preferable that a game player changes a specific player he is operating to the other at least from the start of the game to the end thereof. Such sports games include games imitating tennis singles, judo matches, etc. That is, in a sports game in which the match is, in most cases, played by singles, the sports game can be enjoyed only by operating a selected player.

In a sports game in which the match is played by teams, a plurality of team players imitating sport athletes are displayed on the screen, and a game player must select the specific player the game player wants to operate. Such sports games include games imitating matches of soccer, basketballs, etc.

There are two methods by which a player is selected. In one of the two methods, a game player selects the specific player he will operate as an operational player in a game match before the start of the game, and the game player is not allowed to change the player he is operating during the game. In the other method, a game player is allowed to change an operational player of a game match during the game according to a choice made by the game player.

The method which allows a game player to suitably change a player is applicable to, e.g., soccer games. In a soccer game, a game player likes to operate a specific player in a front position in an offensive situation, while on the other hand, the game player likes to operate a player in a rear position in a defensive situation.

To enable players in a game match to be suitably selected during the game, input operations for selecting operational players are necessary in addition to inputting moving directions and movements of the operational players during the game. This makes the input operations complicated.

To prevent such complicated input operations, in some cases, players at prescribed positions are automatically selected as operational players of a game player. For example, in a game in which coordinates of a position of a ball are a key factor for progress of the game, a player who is nearest to the ball is selected.

The above-described methods, however, by which an operational player is selected, cannot sufficiently satisfy the requirements of game players. That is, in the method by which an operational player is automatically selected, the method of selecting the operational player is unique, and it is possible that the prescribed players may not be those that a game player actually likes to select. The method by which operational players in a game match are suitably selected makes the operation of selecting an operational player in advance of the game too complicated.

As a result, in either of the methods, the game player sometimes can not recognize his own operational players during the game, irrespective of his skill, which actually spoils the amusement of the game.

The method, in which an operational player is not changed during a game match, takes much time to arrive at a new position, when a specific position such as a key factor in a game is greatly changed. That is, in a soccer game, for example, when a long pass is made, even a skilled game player needs time to move to the pass position. As a result, a time when the game player secures a key position to play the game is extremely decreased, which also spoils the amusement of the game.

Thus, it is preferable that operation of selecting specific players in a game match during advance of the game is made without complicating the operation.

Factors for complicating the operation are as follows.

In a soccer game, for example, when a player receives a ball, a game player selects, out of a plurality of players on a game screen, a specific player as an operational player who will receive the ball. The selected player is marked by, e.g., a dotted-line enclosure or other means to be discriminated from the rest of the players. After the selection, the game player operates information input means, such as a control pad or others, to move the operational player to the ball.

The method by which an operational player is selected by a game player has a disadvantage that when a specific player is selected as an operational player by selected-direction information, simultaneously therewith the selected-direction information becomes moving direction information, whereby the operational player is adversely moved in an unintended direction.

That is, as shown in FIG. 14, when an operational player P1 is changed to another operational player by selecting a specific player P2 so as to compete with an opponent player E to get a ball B, selected-direction information of the direction A (see the dotted-line arrow) from the operational player P1 to the operational player P2 is inputted. When the selected-direction information of the direction A is inputted, the operational player P1 is changed to the operational player P2, and the latter P2 is enclosed by the dotted-line. By this time, the game player has inputted the direction information of the direction A, and at the same time that the change is over, the direction information of the direction A becomes moving direction information of the operational player P2. The operational player P2 is moved to the direction A (see the solid line arrow). Thus, although the game player has changed the operational player to get the ball B, the new operational player is moved apart from the ball B.

Conventionally when an object-to-be-moved, such as an operational player or others, displayed on a screen is moved, an information input unit is operated to command a moving direction.

The information input unit is provided by, e.g., a cross key disposed on a control pad of a game machine. The cross key is operated so that when an operational player on a game display of, e.g., a soccer game is moved to get a ball, the operational player can be moved toward the ball.

Generally a cross key is formed in a cross combining a vertical bar and a horizontal bar which are crossed each other at a right angle, and the respective ends are pressed to command moving directions. That is, the upper and the lower ends of the cross key, and the left and the right ends thereof are singly pressed to command the four upper, lower, left and right directions. Furthermore, the upper end and the left end of the cross key, the left end and the lower end thereof, the lower end and the right end thereof, and the right end and the upper end thereof are respectively operated simultaneously to command four obliquely upper left, obliquely lower left, obliquely lower right and obliquely lower right directions. In total, eight directions can be commanded.

When the cross key is operated to command a moving direction so that an operational player is moved to get a ball, a game player operates the cross key so that the operational player P depicts one of the traces x, y, z as exemplified in FIG. 15.

In the case of the trace x, first, the upper end of the cross key is pressed and the players is moved to a position substantially beside a ball B as a target, and then, the right end of the cross key is pressed and the player is moved to the right. In the case of the trace y, first, the upper end of the cross key is pressed and the player is moved in a straight line to an oblique position lower left of the ball B, and then, the right end and the upper end of the cross key are simultaneously pressed and the player is moved in an obliquely upper right direction. In the case of the trace z, first, the right end and the upper end of the cross key are pressed and the player is moved in an obliquely upper right direction, and then, the upper end of the cross key is pressed and the player is moved upward.

Thus whether or not an operational player P can arrive at a ball as intended by a game player depends on his intuition and skill. To arrive at the ball B, however, as exemplified in FIG. 15, an operation for changing a direction at least once is needed. This is not easy for even skilled game players.

The operation of the cross key can command only 8 directions, and unless a game player has sufficient skill, it is very difficult to move operational players P as intended. When an unskilled game player operates, as exemplified in FIG. 16, an operational player P goes around a target ball B without arriving at the ball B. Especially when the ball B is moving, the cross key must be operated many times. A game player needs skill.

An object of the present invention is to provide an image processing method and an image processing device which allow a game player to arbitrarily select one from a plurality of objects-to-be-moved, and prohibits movement of the selected object-to-be-moved in an unintended direction.

Another object of the present invention is to provide an image processing method and an image processing device which can move objects-to-be-moved by easy operation as intended when an input direction is commanded by an information input unit .

DISCLOSURE OF THE INVENTION

The image processing method according to one aspect of the present invention comprises the steps of: computing a plurality of object-to-be-moved directions from the target to a plurality of the objects-to-be-moved, based on coordinates of said plurality of the objects-to-be-moved and coordinates of the target; computing an input direction for the target to be moved in, based on input information from an information input unit; and comparing said plurality of object-to-be-moved directions with the input direction to select one of said plurality of the objects-to-be-moved whose associated object-to-be-moved direction is included in a prescribed range based on an opposite direction to the input direction.

As a result, when a game player selects one of a plurality of objects-to-be-moved, he can arbitrarily select one, and the selected object-to-be-moved is never moved in an unintended direction.

In the image processing method according to another aspect of the present invention, when more than one of the objects-to-be-moved are in the prescribed range, one of the objects-to-be-moved in the prescribed range which has a shortest distance with respect to the target is selected.

As a result, even when a plurality of the objects-to-be-moved are present, one of them can be selected.

In the image processing method according to a further another aspect of the present invention, the prescribed range is a range which is expanded on both sides of the opposite direction of the input direction over an angle smaller than a unit angle of the input direction inputted by the information input unit.

As a result, in the selection a selection range never overlaps adjacent input directions.

In the image processing method according to a further another aspect of the present invention, a unit angle of the object-to-be-moved directions is smaller than the unit angle of the input direction inputted by the information input unit.

As a result, based on input information for a rough unit angle, an object-to-be-moved can be selected based on an accurate unit angle.

In the image processing unit according to a further another aspect of the present invention, the unit angle of the input direction is ⅛ of 360 degrees which is 45 degrees; and the unit angle of the directions for the objects-to-be-moved in is 1/32 of 360 degrees which is 11.25 degrees.

As a result, based on input information from a rough unit angle, an object-to-be-moved can be selected based on an accurate unit angle. In addition, processing of image information can be effectively conducted.

In the image processing method according to a further another aspect of the present invention, the prescribed range is a range (totally 6 unit angles: 67.5 degrees) which is extended on both sides of an opposite direction to the input direction over 33.75 degrees which is three unit angles of the input direction.

As a result, in the conversion of a unit angle of 1/32 of 360 degrees on the display screen, a selection range never overlaps adjacent input directions.

In the image processing method according to a further another aspect of the present invention, standard directions for the object-to-be-moved directions and the input direction are set based on an image of a field displayed together with the objects-to-be-moved and the target.

As a result, even when the field image on the display screen is displaced upside-down and leftside-right, it is possible to input a selection direction as viewed on the display screen.

The image processing device according to one aspect of the present invention comprises an object-to-be-moved direction computing unit for computing a plurality of object-to-be-moved directions from the target to a plurality of the objects-to-be-moved, based on coordinates of said plurality of the objects-to-be-moved and coordinates of the target; an input direction computing unit for computing an input direction for the target to be moved in, based on input information from an information input unit; and an object-to-be-moved selection unit for comparing said plurality of the object-to-be-moved directions with the input direction to select one of said plurality of the objects-to-be-moved whose associated object-to-be-moved direction is included in a prescribed range based on an opposite direction to the input direction.

As a result, when a game player selects one of a plurality of objects-to-be-moved, he can arbitrarily select one, and the selected object-to-be-moved is never moved in an unintended direction.

In the image processing device according to another aspect of the present invention, the object-to-be-moved selecting unit selects one of the objects-to-be-moved in the prescribed range which has a shortest distance with respect to the target is selected when more than one ones of the objects-to-be-moved are in the prescribed range.

As a result, even when a plurality of the objects-to-be-moved are present, one of them can be selected.

In the image processing device according to further another aspect of the present invention, the object-to-be-moved selecting unit selects sets the prescribed range at a range which is extended on both sides of the opposite direction of the input direction over an angle smaller than a unit angle of the input direction inputted by the information input unit.

As a result, in the selection a selection range never overlaps adjacent input directions.

In the image processing device according to further another aspect of the present invention, the object-to-be-moved direction computing unit sets a unit angle of the object-to-be-moved directions to be smaller than the unit angle of the input direction inputted by the information input unit.

As a result, based on input information from a rough unit angle, an object-to-be-moved can be selected based on an accurate unit angle.

In the image processing device according to further another aspect of the present invention, the unit angle of the input direction is ⅛ of 360 degrees which is 45 degrees; and the unit angle of the directions for the objects-to-be-moved in is 1/32 of 360 degrees which is 11.25 degrees.

As a result, based on input information in a rough unit angle, an object-to-be-moved can be selected based on an accurate unit angle. In addition, processing of image information can be effectively conducted.

In the image processing device according to further another aspect of the present invention, the object-to-be-moved selecting unit sets the prescribed range at a range (totally 6 unit angles: 67.5 degrees) which is extended on both sides of an opposite direction to the input direction over 33.75 degrees which is three unit angles of the input direction.

As a result, in the conversion in a unit angle of 1/32 of 360 degrees on the display screen, a selection range never overlaps adjacent input directions.

In the image processing device according to further another aspect of the present invention, standard directions for the object-to-be-moved directions and the input direction are set based on an image of a field displayed together with the objects-to-be-moved and the target.

As a result, even when the field image on the display screen is displaced upside-down and leftside-right, it is possible to input a selection direction as viewed on the display screen.

The image processing method according to one aspect of the present invention comprises the steps of: computing target directions from the objects-to-be-moved to the target, based on coordinates of the objects-to-be-moved and coordinates of the target; computing an input direction for moving the objects-to-be-moved in, based on input information from an information input unit; and converting the input direction to the target direction when an offset angle between the input direction and the target direction is within a prescribed range.

As a result, in commanding an input direction by the information input unit, the commanded input direction is divided more finely in simulation to be more accurate input direction, and an object-to-be-moved can be moved by simple operation.

In the image processing method according to another aspect of the present invention, the prescribed range is extended on both sides of the target direction over an angle smaller than a unit angle of the input direction inputted by the information input unit.

As a result, an input direction can be converted into a suitable direction as intended by a game player.

In the image processing method according to further another aspect of the present invention, a unit angle of the target direction is smaller than the unit angle of the input direction inputted by the information input unit.

As a result, a rough input angle of input information can be converted to more accurate unit angle.

In the image processing method according to further another aspect of the present invention, the unit angle of the input direction is ⅛ of 360 degrees which is 45 degrees; and the unit angle of the target direction is 1/32 of 360 degrees which is 11.25 degrees.

As a result, a rough input angle of input information can be converted to more accurate unit angle. In addition, the image processing can be effectively conducted.

In the image processing method according to further another aspect of the present invention, the prescribed range is extended on both sides of the target direction over 33.75 degrees which is three unit angles of the input direction.

As a result, in the conversion in a unit angle of 1/32 of 360 degrees on the display screen, a selection range never overlap adjacent input directions.

In the processing method according to further another aspect of the present invention, standard directions for the target directions and the input direction are set based on a field image displayed together with the objects-to-be-moved and the target.

As a result, even when the field image on the display screen is displaced upside-down and leftside-right, it is possible to input a selection direction as viewed on the display screen.

The image processing device according to one aspect of the present invention comprises a target direction computing unit for computing target directions from the objects-to-be-moved to the target, based on coordinates of the objects-to-be-moved and coordinates of the target; an input direction computing unit for computing an input direction for moving the objects-to-be-moved in, based on input information from an information input unit; and an input direction converting unit for converting the input direction to the target direction when an offset angle between the input direction and the target direction is within a prescribed range.

As a result, in commanding an input direction by the information input unit, the commanded input direction is divided more finely in simulation to be more accurate input direction, and an object-to-be-moved can be moved by simple operation.

In the image processing device according to another aspect of the present invention, the input direction converting unit sets the prescribed range on both sides of the target direction over an angle smaller than a unit angle of the input direction inputted by the information input unit.

As a result, an input direction can be converted to a suitable direction as intended by a game player.

In the image processing device according to further another aspect of the present invention, the target direction computing unit sets a unit angle of the target direction to be smaller than the unit angle of the input direction inputted by the information input unit.

As a result, a rough unit angle of input information can be converted to a more accurate unit angle.

In the image processing device according to further another aspect of the present invention, the unit angle of the input direction is ⅛ of 360 degrees which is 45 degrees; and the unit angle of the target direction is 1/32 of 360 degrees which is 11.25 degrees.

As a result, a rough unit angle of input information can be converted to a more accurate unit angle. In addition, the image processing can be effectively conducted.

In the image processing device according to further another aspect of the present invention, the prescribed range (totally 6 unit angles: 67.5 degrees) is extended on both sides of the target direction over 33.75 degrees, three unit angles of the input direction.

As a result, in the conversion in a unit angle of 1/32 of 360 degrees on the display screen, a selection range never overlaps adjacent input directions.

In the processing device according to further another aspect of the present invention, standard directions for the target directions and the input direction are set based on a field image displayed together with the objects-to-be-moved and the target.

As a result, even when the field image on the display screen is displaced upside-down and leftside-right, it is possible to input a selection direction as viewed on the display screen.

BEST MODES FOR CARRYING OUT THE INVENTION

The image processing device according to a first embodiment of the present invention will be explained with reference to FIGS. 1 to 13.

Figure 1:
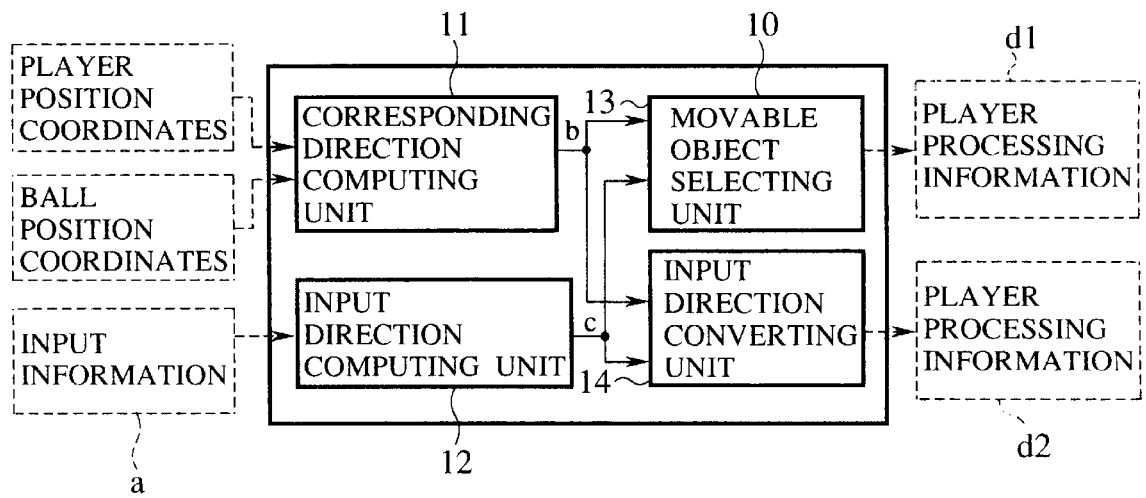
FIG. 1 is a block diagram of the image processing device according to one embodiment of the present invention.

As shown in FIG. 1, the image processing device 10 comprises a corresponding direction computing unit 11, an input direction computing unit 12, an object-to-be-moved selecting unit 13 and an input direction converting unit 14.

The corresponding direction computing unit 11 computes, based on position coordinates of players as objects-to-be-moved and position coordinates of a ball as a target, corresponding directions "b" of player directions from the ball to respective players or ball directions from the players to the ball. The input direction computing unit 12 computes, based on input information from a cross key, an input direction "c" in which a player or a ball is moved.

The object-to-be-moved selecting unit 13 compares player directions "b" for a plurality of players computed by the corresponding direction computing unit 11 with an input direction "c" computed by the input direction computing unit 12 to select an optimum player out of the plural players, and outputs a selection result as player processing information d1.

The input direction converting unit 14 compares a ball direction "b" computed by the corresponding direction computing unit 11 with an input direction "c" computed by the input direction computing unit 12, and converting the input direction "c" to a target direction "b" when an offset angle between the ball direction "b" and the input direction "c" is within a prescribed range, and outputs a conversion result as player processing information d2.

Figure 2:
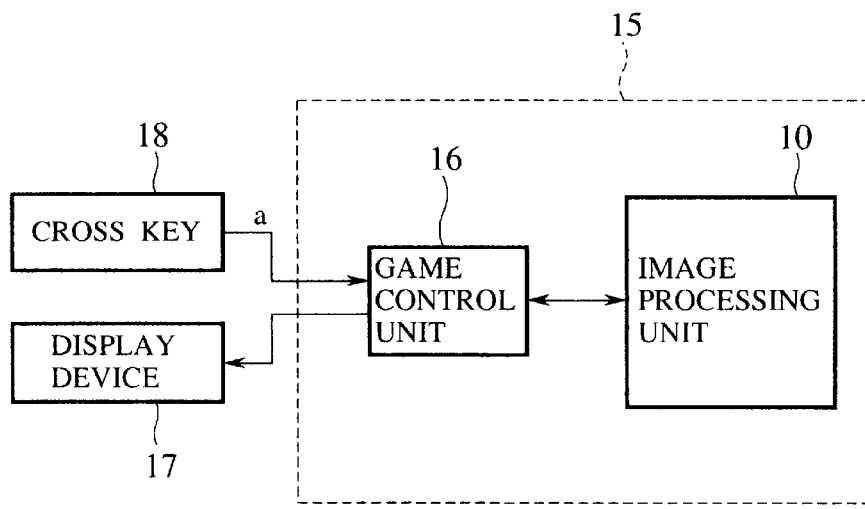
FIG. 2 is a diagrammatic block diagram of the game device.

As shown in FIG. 2, the image processing device 10 is incorporated in a game machine 15 to form game displays. The game displays are shown on a display device 17 through a game control unit 16. Input information "a" is inputted to the game control unit 16 by an information input unit, such as a cross key 18, a joy stick or other means.

Figure 3:
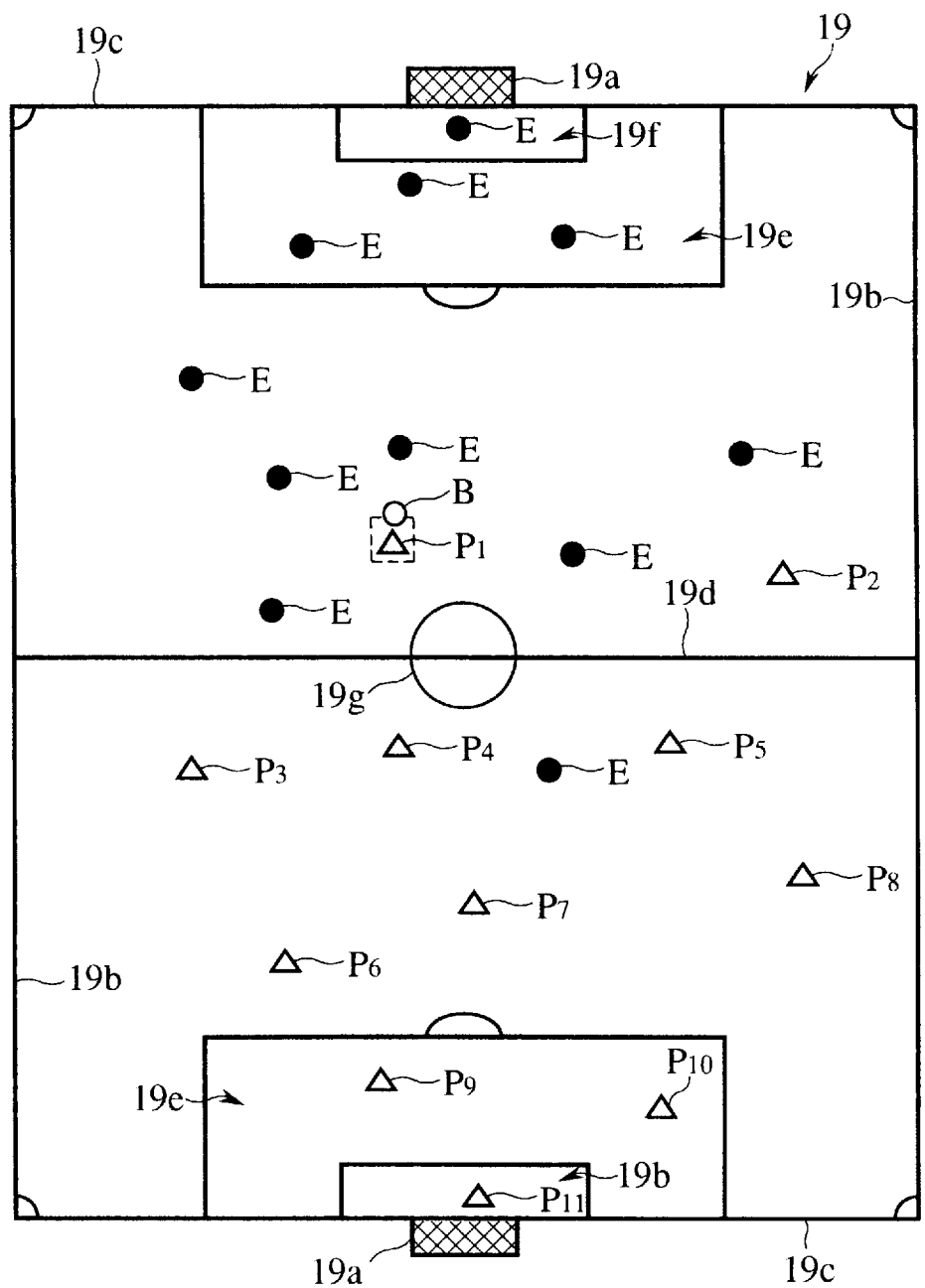
FIG. 3 is an explanatory view of a field on which players and opponents, and the ball, etc.

In a case that a soccer game is played on the game machine 15, as shown in FIG. 3, on the game screen there is displayed a background including a field 19, a soccer goal 19a, a stand (not shown), etc., a ball B, and eleven players (P1–P11) of a team on the side of a game player and eleven players E of a competing team, etc. The field 19, the respective players P, E, etc. are suitably all or partially displayed on the screen, depending on developments of the game. The game player-side players are arbitrarily moved by operations of the cross key 18 by the game player. One player P of his-side players P which the game player can operate is indicated by a marker. The marker is in the form of a specific mark attached to the game player P, an entire dotted-line enclosure (see FIG. 3) or others.

Hereinafter the game player-side players will be called players P, and the competing players will be called opponents E.

Figure 4:
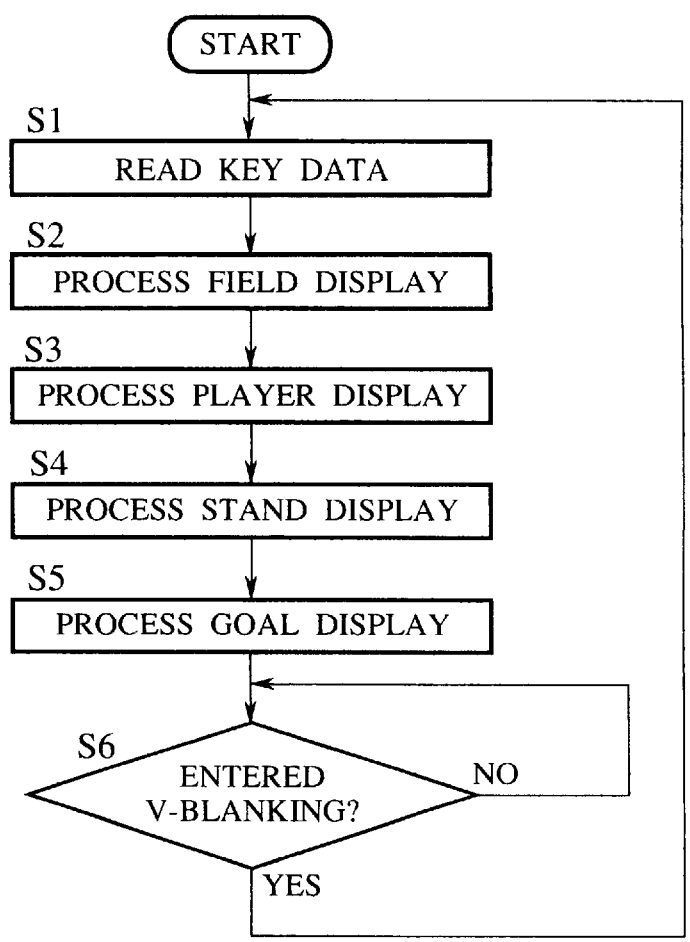
FIG. 4 is a flow chart of the steps of a process for forming game displays.

The process for forming game displays will be explained with reference to the flow chart of FIG. 4.

First, key data is read (step S1). The key data, which is input information from the cross key 18, is stored in a memory area of a RAM or others. The key data is stored to store input information "a" for a game player moving a player P. The key data is checked for every vertical blanking interval (V-blanking).

Subsequently, processing for a field display is conducted (step S2). A field 19 for the soccer game including the touch lines 19b, the goal lines 19c, the half way line 19d, the penalty areas 19e, the goal areas 19f, the center circle 19g, etc. are displayed (see FIG. 3).

Then, processing for displaying the players is conducted (step S3). The players P and the opponents E, totally 22 match players, who are moved on the field 19, following the ball B are displayed (see FIG. 3).

Then, processing for displaying a stand is conducted (step S4). Stands, etc. disposed around the field 19 are displayed.

Next, processing for displaying the goals is conducted (step S5). The nets provided on the goals 19a, 19b are displayed (see FIG. 3).

Subsequently, it is judged whether or not a vertical blanking interval (V-blanking) has started (step S6). When a vertical blanking interval has started, the processing is returned to the step S1, and key data is read.

In this process for forming the game displays, when the processing for displaying the players is conducted, processing for moving the players P, following the ball B on the field is conducted.

Figure 5:
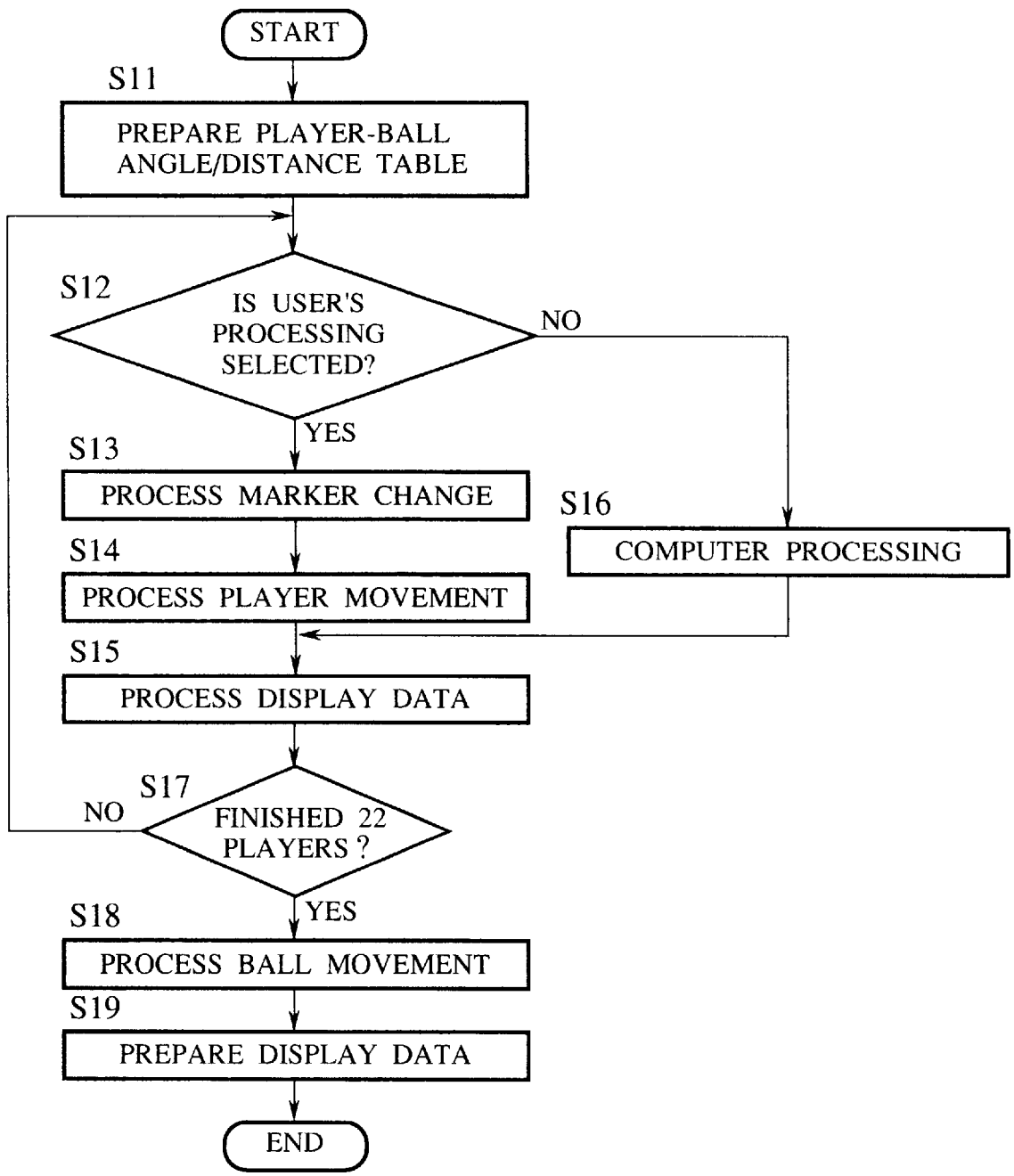
FIG. 5 is a flow chart of the steps of a process for displaying the players.

The processing for displaying the players (step S3) will be detailed with reference to the flow chart of FIG. 5.

First, an angle/distance table of the players P and the ball B is prepared (step S11). The angle/distance table records angles and distances on the field 19 of the 11 players P and the eleven opponents, and the ball B. The angles and distances are prepared based on coordinates of the players P, the opponents E and the ball B on game displays.

Subsequently, it is judged whether or not the selection of a player P is made by user's processing (step S12). It is judged whether the selection of a player P is made by user's processing determined by a game player or by computer processing by the computer incorporated in the game machine. By the user's processing, for example, a player P at a specific position the game player likes to operate can be selected. On the other hand, by the computer processing, for example, a player P who is located nearest the ball B is selected.

When the user's processing is selected in step S12, object selecting processing is conducted (step S13). By the object selecting processing, the marker is transferred to the player P selected by the game player. The marker is added to distinguish a player P to be operated by the game player. The transfer of the marker enables the game player to distinguish the selected player P from the rest players P. The game player P can operate the marked player P to arbitrarily move the player P. The object selection is conducted by the game player operating a control pad or others and selecting a player P.

Subsequently, player moving processing follows (step S14). The player P is moved in the field 19, following the ball B to receive the ball B by the game player operating a player P to which the marker has been transferred.

Then, display data for player moving processing by the user's processing is prepared (step S15). Based on the display data, image processing for a series of player moving processing is conducted, and game images are displayed on the display device 17.

On the other hand, in step S12, when the user's processing is not selected, the computer processing is selected (step S16). When the computer processing is selected, a selected player P is moved in the field 19, following the ball B to receive the ball B. Then, the step S15 follows, and display data for the player moving processing by the computer processing is prepared.

Subsequently, it is judged whether or not preparation of display data for all the players P and opponents E, totalling 22 players, is complete (step S17). When the preparation of the display data is not complete, the processing is returned to step S12.

On the other hand, when the preparation of the display data is complete, ball moving processing is conducted (step S18).

Then, display data for the ball moving processing is prepared (step S19). Based on the display data, image processing for the ball moving processing is conducted, and game images are displayed on the display device 17.

When the player moving processing is conducted, the object-to-be-moved selecting unit 13 selects, without failure, a player P the game player likes to operate, and the marker is transferred.

The corresponding direction computing unit 11 computes, in a unit angle, corresponding directions of the players P as the objects to be moved, with respect to the ball B as a target which are displayed on game displays, based on coordinates of the ball B and of the players P. The players P are players on the side of a game player, and any of the 11 players on his side is an object to be moved. That is, a player P is represented by Pn (n=1–11). For example, corresponding directions are computed on the 10 players displayed on game displays except a player at the goal keeper position. Respective computed corresponding direction data b are outputted to the object-to-be-moved selecting unit 13 (see FIG. 1).

Figure 6:
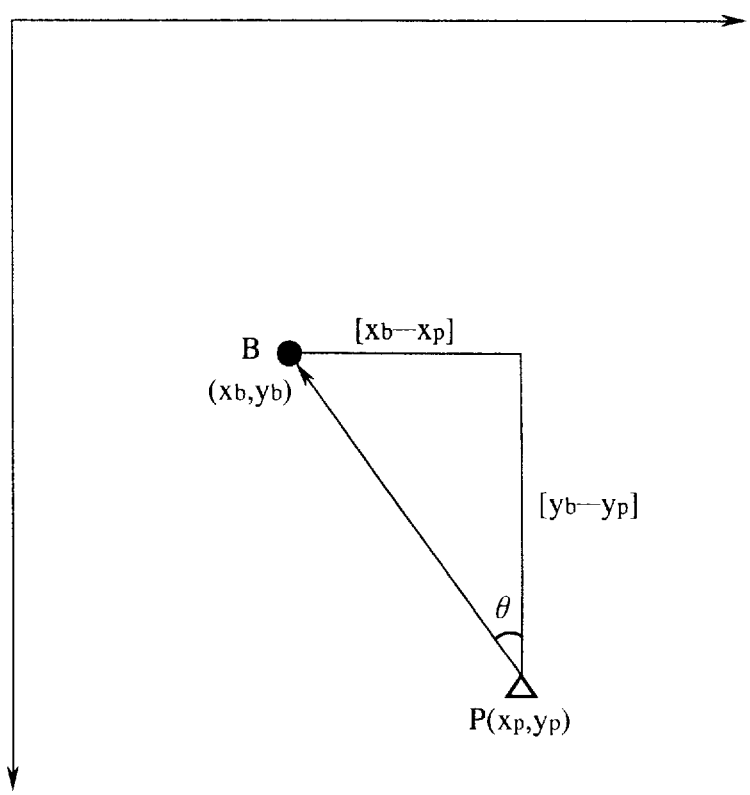
FIG. 6 is an explanatory view of coordinates of the ball and coordinates of players on a game display.

A corresponding angle $\theta$ indicative of a corresponding direction of a player P with respect to the ball B is given by $\tan^{-1}(Yb-Xp)/(Yb-Yp)$ as shown in FIG. 6, based on coordinates (Xb, Yb) of the ball B on a game display and coordinates (Xp, Yp) of the player on the game display.

Figure 7:
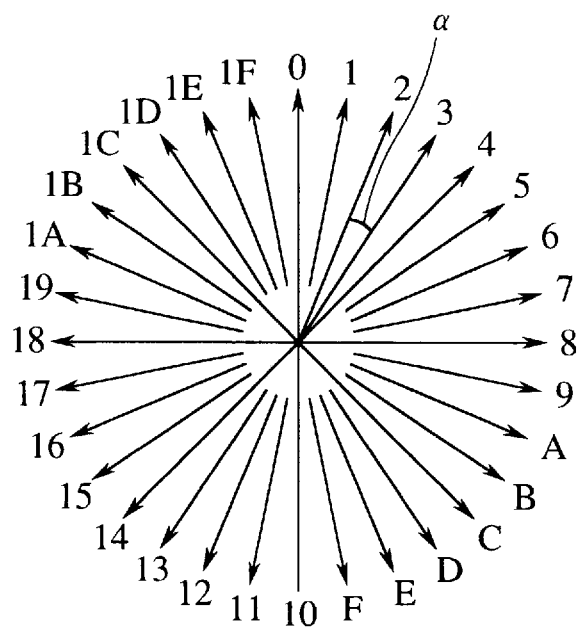
FIG. 7 is an explanatory view of 360 degrees on a display screen equidivided in 32 directions.

As shown in FIG. 7, the unit angle $\alpha$ is set at 11.25 degrees which is given by dividing the 360 degrees around a player P on a game display into 32 directions from 0 to 1F in hexadecimal notation. The unit angle $\alpha$ is divided smaller than a unit angle (45 degrees) indicative of a direction of an input direction a, which is input information from the cross key 18. A corresponding angle $\theta$ is rounded to integer multiplied by 11.25 degrees, which is the unit angle $\alpha$. The unit angle $\alpha$ is given by dividing 360 degrees into 32 directions in hexadecimal notation, whereby processing of image information can be effectively performed.

Accordingly the respective corresponding directions indicate those of the 32 directions from 0 to 1F corresponding to corresponding angles $\theta$.

A movement amount in a corresponding direction is judged by a unit speed table corresponding to a corresponding angle $\theta$. The unit speed table stores movement amounts in the X-direction and movement amounts in the Y-direction which correspond to the respective 32 directions from 0 to 1F.

The input direction computing unit 12 computes an input direction in the unit angle α, based on input information "a" for moving the ball B in a specific direction inputted by the cross key 18. Computed input direction data c is outputted to the object-to-be-moved selecting unit 13 (see FIG. 1).

Figure 8:
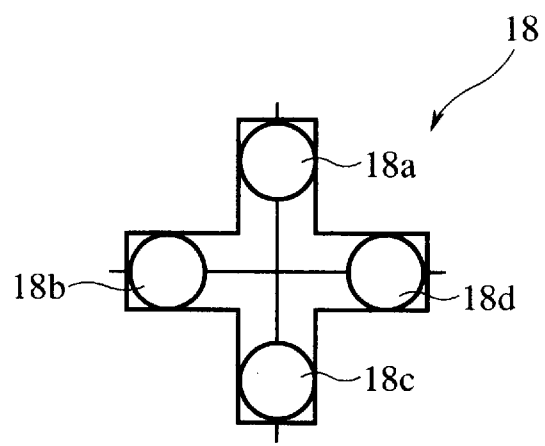
FIG. 8 is an explanatory view of the cross key.

As shown in FIG. 8, the cross key 18 is formed in a cross combining a vertical bar and a horizontal bar, and the respective ends are pressed to command moving directions. That is, the upper end 18a, the left end 18b, the lower end 18c and the right end 18d are operated independently of each other to command four direction, upward, left, downward and right directions. Furthermore, the upper end 18a and the left end 18b, the left end 18b and the lower end 18c, the lower end 18c and the right end 18d, and the right end 18d and the upper end 18a may be pressed simultaneously respectively, whereby four directions, obliquely upper left, obliquely lower left, obliquely lower right and obliquely upper right, can be commanded. Total 8 directions can be commanded.

Input information "a" of the 8 inputted directions by the cross key 18 correspond to the 32 directions from 0 to 1F in the unit angle α. The upward direction corresponds to 0; the downward direction, 10; the left direction, 18; the right direction, 8; the obliquely upper left direction, 1C; the obliquely lower left direction, 14; the obliquely lower right direction, C; and the obliquely upper right direction, 4 (see FIG. 7).

Accordingly inputted input information "a" indicates one of 0, 4, 8, C, 10, 14, 18 and 1C in the unit angle α.

The object-to-be-moved selecting unit 13 compares the respective corresponding direction data b with input direction data c to select a specific player P out of the players P, who is faced in a direction opposite to a direction included in a prescribed range based on input direction. Three of the respective corresponding direction data b are selected in the order of a shortest distance from the ball B, whereby three of the players P are selected in the order of a shortest distance to the ball. The object-to-be-moved selecting data, which are a result of the selection, are outputted to the player processing information d1 (see FIG. 1).

The prescribed range is a range of a corresponding direction of an input direction. The range does not include adjacent input directions. Here the prescribed range is a range which is extended over three unit angles α on both sides of a corresponding direction. The adjacent input directions are input directions adjacent to an input direction on both sides of the input direction and, in FIG. 7, the input direction 0 or an input direction 18 with respect to the input direction 1C. Thus by setting the prescribed range, an input direction can be converted as a game player intends. That is, if the prescribed range is extended over four unit angles α, 11.25 degrees multiplied 4 equal 45 degrees which agrees with unit angles α, and when an input direction is 18, the input directions 1C, 14 are included as adjacent input directions (see FIG. 7).

An example of selecting a specific player P is selected by the object-to-be-moved selecting unit 13 will be explained with reference to FIGS. 6 and 10.

On the field 19 an enemy E is moving with the ball B, and the ball B is advancing toward the goal 19a. A player P is indicated by the marker, and a game player can arbitrarily move the player P, a specific player, by operating the cross key 18.

To block the ball B, the game player tries to move one of the players P to the ball. In this case, the game player operates the cross key 18 to command the upward direction and input information "a" for moving the ball B in a specific direction. That is, the game player inputs the input direction 0 (see FIG. 7) which is opposite to the input direction 10 of advance of the ball B (see FIG. 7). The input information "a" inputted by the cross key 18 indicates 0 as the input direction.

Here a specific one P of the three players P1, P2, P3 selected in the order of a shortest distance to the ball B, who has a corresponding direction opposite to a direction included in a prescribed range corresponding to an input direction is selected. The opposite direction means a direction which is turned by 180 degrees on the ball B and is very opposite direction. The selection is conducted based on differences between movement angles indicative of the input direction 0 and corresponding angles θ indicative of respective corresponding directions of the three players P1, P2, P3. In the three players P1, P2, P3, the player P3 has the corresponding direction 13, and the corresponding direction 13 is opposite to the direction 3 which is spaced right from the input direction 0 by three unit angles α, and is judged to be within the prescribed range. The direction 13 is judged to be within the prescribed range, whereby the player 3 is selected as a specific player P, and the marker is transferred to the player 3 (see the dot-line enclosure in FIG. 9).

In short, it is judged that the player P3 is an optimum player who is operated to block advance of the ball B, and the marker is transferred.

At the same time that the marker is transferred, the player P3 is moved to the ball B in accordance with input information "a" inputted by operation of the cross key 18 by the game player.

That is, only when a player P is positioned in a range opposite to a direction of an angular width (1D–3 in FIG. 7) which is three times the unit angle α with respect to the input direction 0, the player P is selected, and the marker is transferred thereto. In cases other than this case, the marker is transferred to the nearest player P to the ball B.

Figure 9:
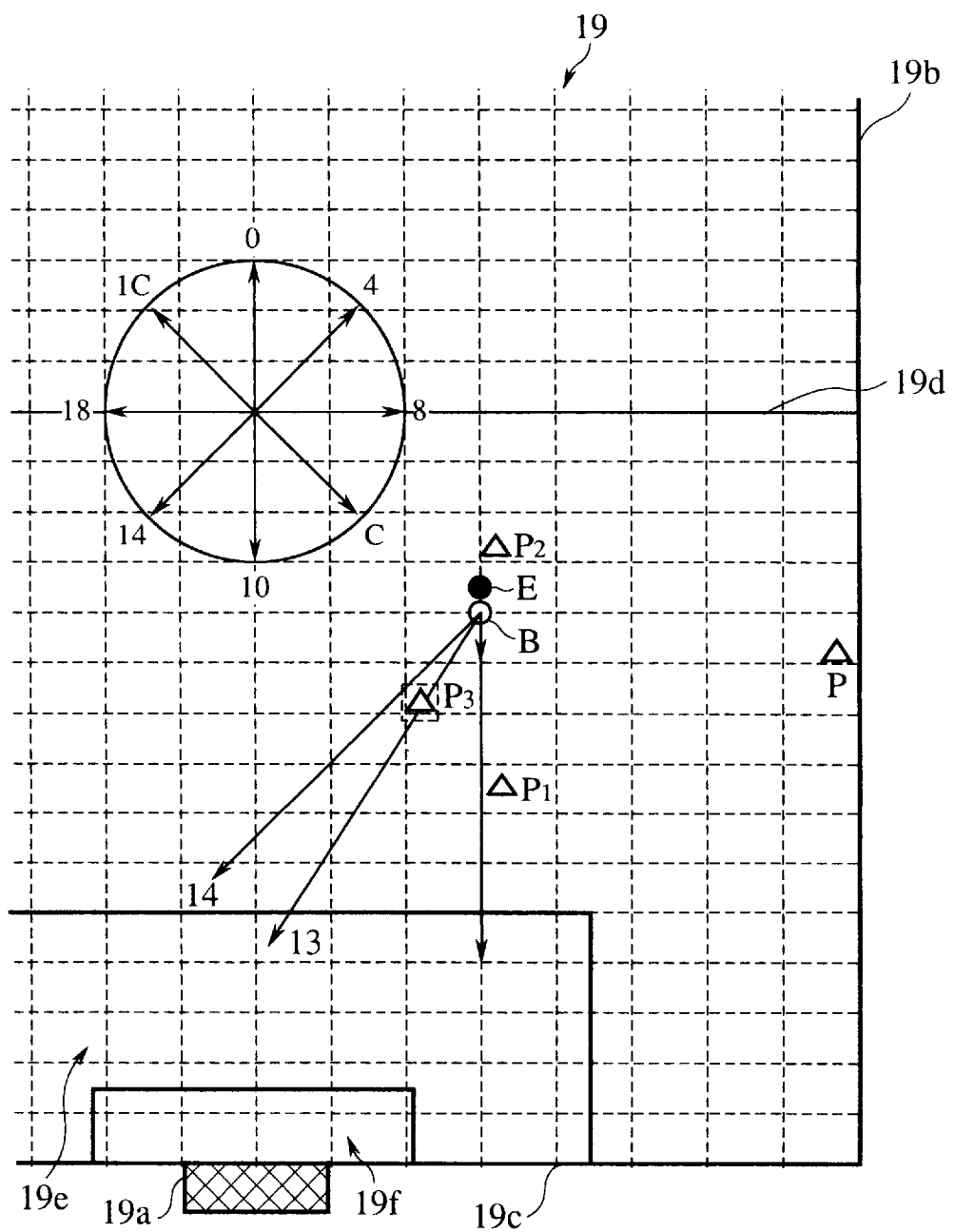
FIG. 9 is an explanatory view of an example of selecting a specific player by the object-to-be-moved selecting unit according to the embodiment.

Accordingly, in FIG. 9, also when the game player commands the obliquely upper right direction 4 by operating the cross key 18, the marker is transferred to the player P3, but when the game player commands a direction other than the obliquely upper right direction 4, the marker is transferred to the player P2.

Figure 10:
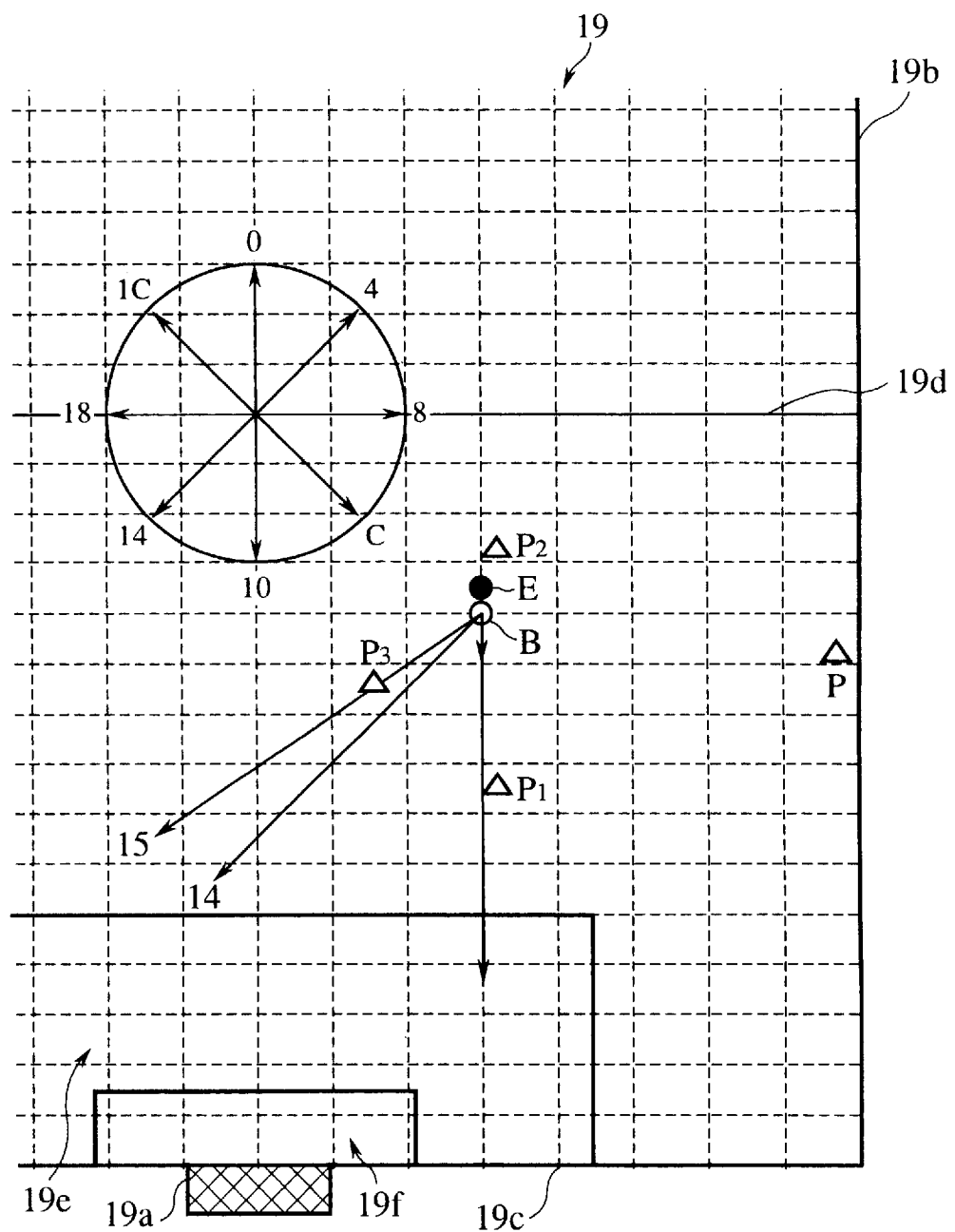
FIG. 10 is an explanatory view of another example of selecting a specific player by the object-to-be-moved selecting unit according to the embodiment of the present invention.

Also as shown in FIG. 10, when the player P3 is positioned in the direction 15 opposite to the direction 5 spaced right from the input direction 0 by 5 unit angles α, the marker is transferred as follows. When the game player operates the cross key 18 to command the upward direction 0, the marker is transferred to the player 1, and the marker is transferred to the player P3 when the obliquely upper right direction 4 is commanded. When a direction other than these directions is selected, the marker is transferred to the player P2.

As a result, an input direction of the ball B to be operated by the game player is inputted as information operational information "a", so that a player P who is at an optimum position to operate the ball B to the input direction is selected, and the marker is transferred.

Figure 11:
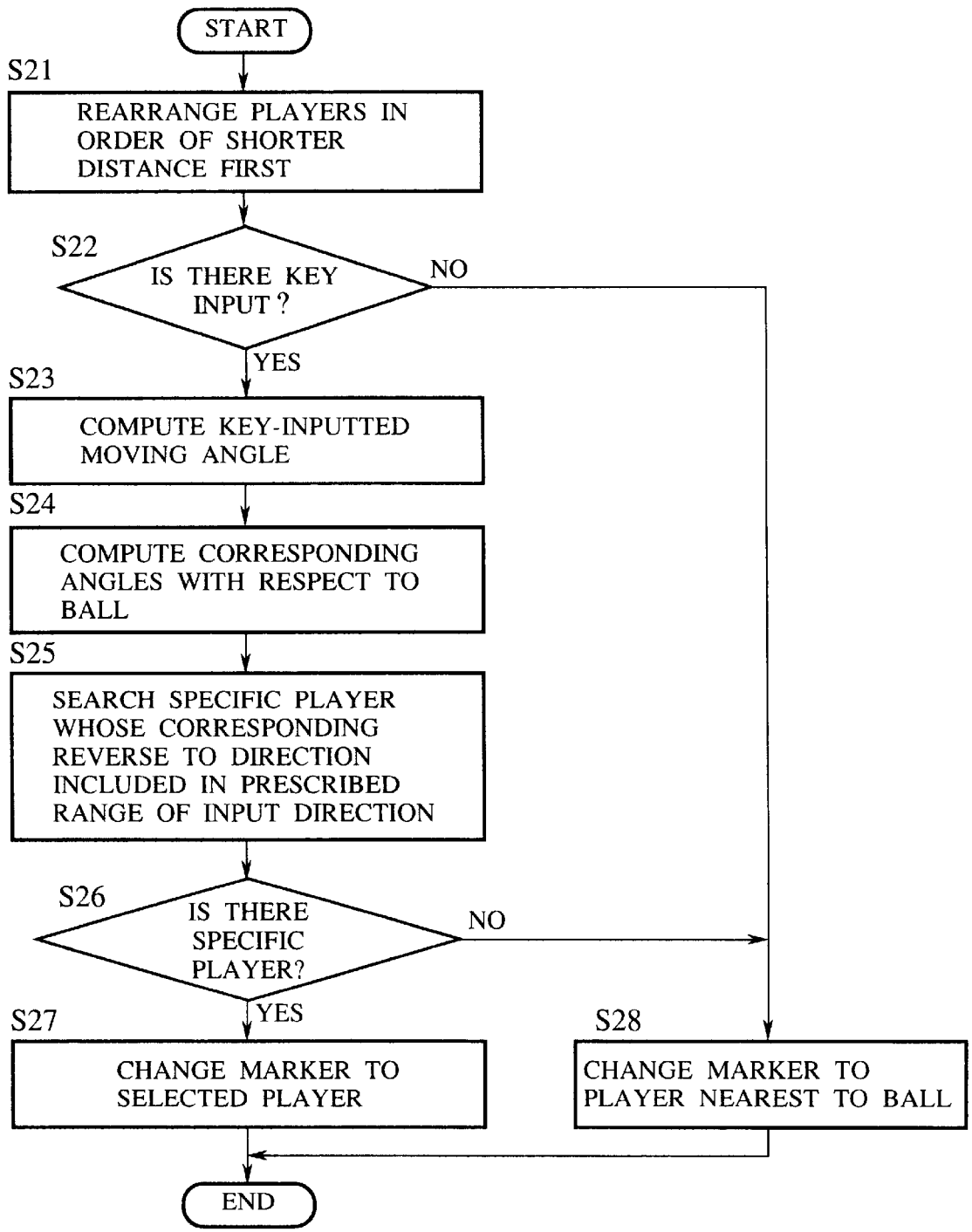
FIG. 11 is a flow chart of the steps of a process for transferring the marker by the object-to-be-moved selecting unit according too the embodiment of the present invention.

Then, the marker transfer processing steps by the object-to-be-moved selecting unit 13 will be explained with reference to the flow chart of FIG. 11.

First, the players P are arranged in the order of a shortest distance to the ball B (step S21). Based on coordinates of the 10 players P, the players P are rearranged in the order of a shortest distance to the ball B. Out of the 10 players P the top three players P in the order of a shortest distance to the ball B are selected, and the following processing is conducted on the three players P.

Then, it is judged whether or not a key input is present (step S22). It is judged whether or not input information "a" has been inputted by the cross key 18, and when a key input is present, a moving angle of the key input is computed (step S23). Based on the input information "a" by the key inputting, an input direction is computed in the unit angle α.

Then, a corresponding angle θ with respect to the ball B is computed (step S24). Based on respective coordinates of the ball B and of the three players P, corresponding angles θ of the respective players P with respect to the ball B are computed in the unit angle α. Based on the corresponding angles θ, corresponding directions of the respective players P are given.

Subsequently, a specific player P whose corresponding direction is opposite to a direction included in the prescribed range of the input direction is searched (step S25). Whether or not a specific player P is opposite to a direction included in the prescribed range of an input direction is judged by giving a difference between a corresponding angle θ to the ball B and a key-inputted movement angle for comparison with each other. The comparison is conducted on three players P who are located in the order of a nearest distance to the ball B, and one of the three players P whose angular difference corresponds to a direction opposite to a direction which is in the range of 3 unit angles α.

Then, whether or not a specific player P is present is judged (step S26). When the specific player P is present, the marker is transferred to the specific player P (step S27). On the other hand, when the specific player P is absent, the marker is transferred to a player P who is nearest to the ball B (step S28).

Whether or not a key input is present is judged (step S22), and when no key input is present, the marker is transferred to a player P who is nearest to the ball B (step S28).

Consequently, at the same time that the marker is transferred, the specific player P is moved to an input direction based on input information "a" inputted by operation of the cross key 18 by the game player.

Thus, by inputting as operational information "a" moving direction of the ball B in which a game player wishes a player P to move, a player P who is located at an optimum position to move the ball in the intended moving direction is selected as a specific player P, and the marker is transferred to the specific player P.

As a result, when a specific player P is selected out of a plurality of players P, a game player can arbitrarily select the specific player P, and furthermore, the specific player is never moved in unintended direction. Accordingly the specific player P can be moved to the ball B without failure and speedily, and a game player watches only movements of the ball B and can concentrate on playing a soccer game.

Furthermore, in selecting a specific player P, although input information inputted by the cross key 18 can input only 8 directions, more than 8 accurate, optimum directions can be judged, and a specific player P can be selected based on the optimum directions. The judgement of the optimum directions is not essentially based on the input information from the cross key 18 and may be based on the input information from information input devices, such as a mouse, a joy stick or others, which can input direction information.

The input direction converting unit 14 uses a movement display direction of a player P as a corresponding direction computed by the corresponding direction computing unit 11 when an angular difference between an input direction computed by the input direction computing unit 12 and the corresponding direction is within the prescribed range. That is, the input direction converting unit 14 compares corresponding direction data b with input direction data c, and when the input direction is within the prescribed range of the corresponding direction, converts the input direction to the corresponding direction. Direction converted data as a conversion result is outputted as player processing information d2 (see FIG. 1).

A prescribed range is a range which, when an input direction is converted to a corresponding direction, does not include adjacent input directions, and here is a range which does not include 3 unit angles α which are adjacent to the input direction on both sides of the input direction. The adjacent input directions are input directions which are adjacent to the input direction on both sides thereof and, in FIG. 7, are the input direction 0 or the input direction 18 with respect to the input direction 1C. By thus setting the prescribed range, an input direction can be converted to an input direction as intended by a game player. That is, if the prescribed range is 4 unit angles α, 11.25×4=45 degrees which agrees with the unit angle, and when an input direction is 18, the prescribed range includes the adjacent input direction 1C and the adjacent input direction 14 (see FIG. 7).

An example of converting an input direction to a corresponding direction by the input direction converting unit 14 will be explained with reference to FIG. 7.

When the ball B is positioned in the 1D direction with respect to a player B, a game player wishes the player P to get the ball B and operates the cross key 18 to command the obliquely upper left direction. Input information "a" inputted by the cross key 18 indicates the input direction 1C. Here the corresponding direction 1D and the input direction 1C are compared with each other. The comparison is based on an angular difference between a moving angle indicative of the input direction 1C and a corresponding angle θ indicative of the corresponding direction 1D. The input direction 1C is spaced from the corresponding direction 1D by one unit angle α, and it is judged that the angular difference between the input direction and the corresponding direction is within the prescribed range. Based on the judgement that the angular difference is within the prescribed range., it is judged that the corresponding direction 1D is the optimum direction for the input direction 1C. Then, the input direction 1C is converted to the corresponding direction 1D as a movement display direction.

That is, the input direction 1C is converted to the corresponding direction 1D only when the input direction 1C based on the input information "a" inputted by the cross key 18 is within an angular width which is 3 times the unit angle α (1A to 0 in FIG. 7) from a position of the ball B, and in the other cases the input direction 1C is left unconverted.

As a result, a difference between an input direction in the unit angle α and a corresponding direction in the unit angle α is nullified by the judgement of an optimum direction by comparison between the input direction and the corresponding direction. On the other hand, when it is judged that the input direction 1C is outside the prescribed range, the input direction 1C based on the input information "a" is used, and the input information is not converted.

Figure 12:
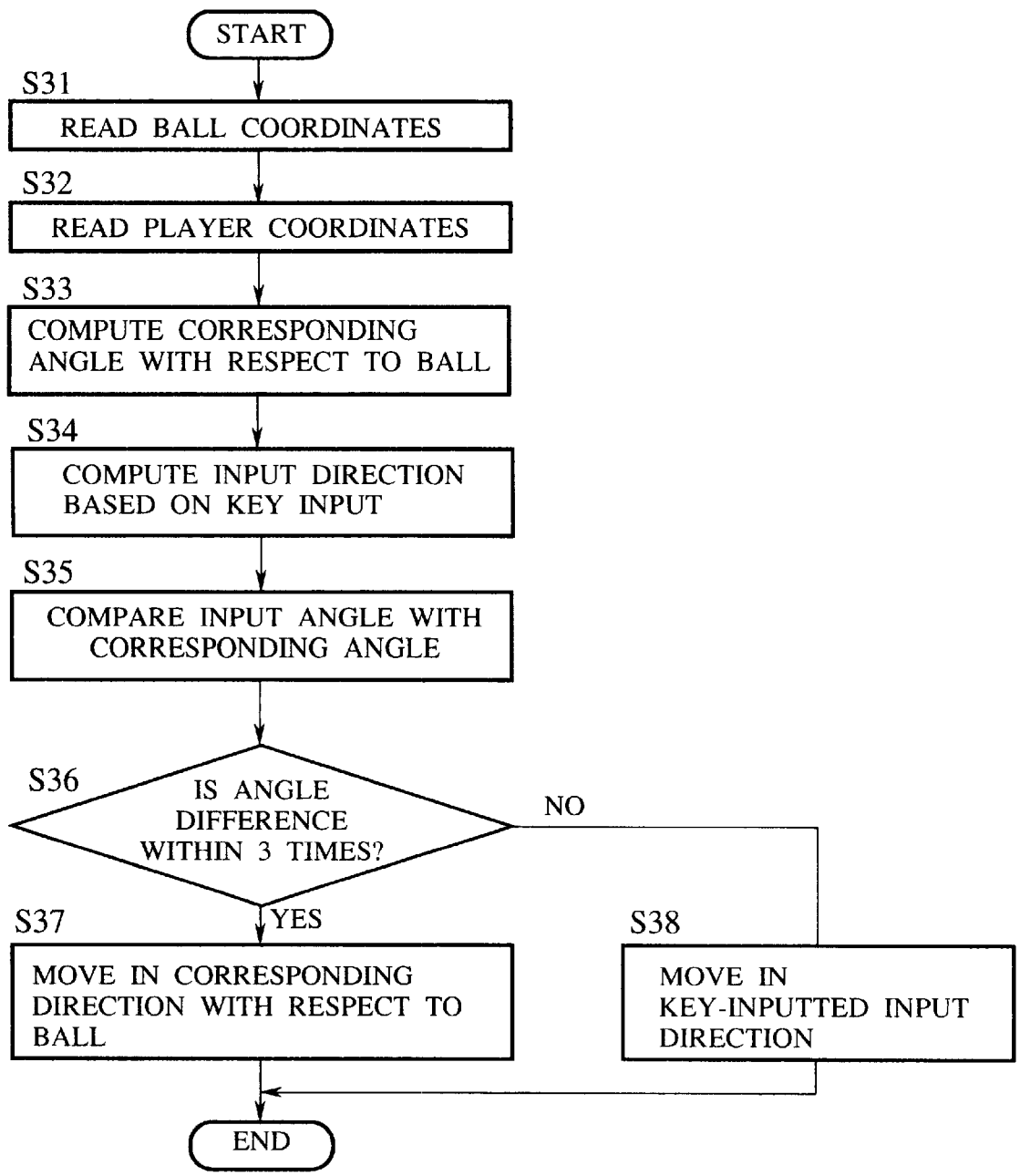
FIG. 12 is a flow chart of the steps of a process for moving a player by the input direction converting unit according to the embodiment of the present invention.

Then, the player moving processing steps by the image processing device 10 will be explained with reference to the flow chart of FIG. 12.

First, coordinates of the ball B are read (step S31). The coordinates of the ball B, which is an object to be moved on a game display.

Subsequently, coordinates of a player P are read (step S32). Coordinates of a player P, which is an object to be moved on the game display and selected by a game player.

Then, a corresponding angle η of the ball B is computed. A corresponding direction of the player P with respect to the ball B is given based on the corresponding angle θ.

Subsequently, an input direction is computed based on a key input (step S34). An input direction based on the unit angle α is computed, based on input information "a" inputted by the cross key 18 for moving the player P.

Next, the corresponding angle θ and a movement angle are compared (step S35). A difference between the corresponding angle θ and the movement angle is for comparison between the two.

Subsequently, it is judged whether or not an angular difference between the two angles is within 3 times the unit angle α (step S36). When a result of the comparison between the corresponding angle θ and the movement angle is that an angular difference is within 3 times, the movement angle is converted to the corresponding angle θ, and the player P is moved in the corresponding direction with respect to the ball B (step S37). On the other hand, when the angular difference is not within the 3 times, the movement angle is not converted to a corresponding angle θ, and the player P is moved in the input direction inputted by the cross key (step S38).

Accordingly, when an input direction is within an angular which is 3 times the unit angle α from a position of the ball B, the input direction is converted to a corresponding direction, and the player P can get the ball B without failure.

Figure 13:
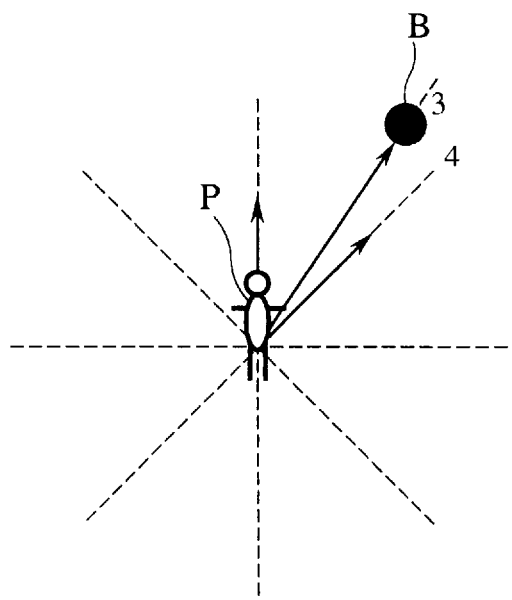
FIG. 13 is an explanatory view of the operation of a player by the input direction converting unit according to the embodiment of the present invention.
Figure 14:
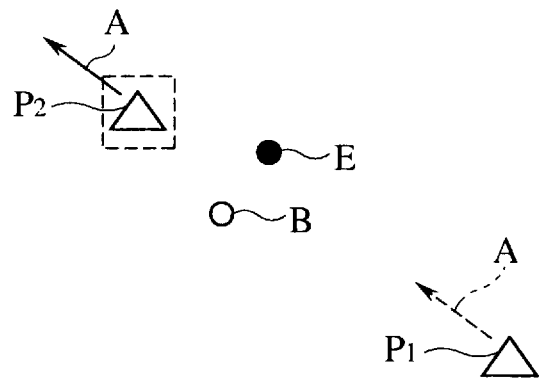
FIG. 14 is an explanatory view of a specific player being moved in an unintended direction by the conventional operation by the cross key.

As a result, as shown in FIG. 13, even when a key input direction inputted by the operation of the cross key 8 by a game player is the obliquely upper right direction 4 (see FIG. 7), the player P is moved to the ball B in the corresponding direction 3 (see FIG. 7) and can get the ball B. The game player continues to input the obliquely upper right direction 4 as a key input direction.

Figure 15:
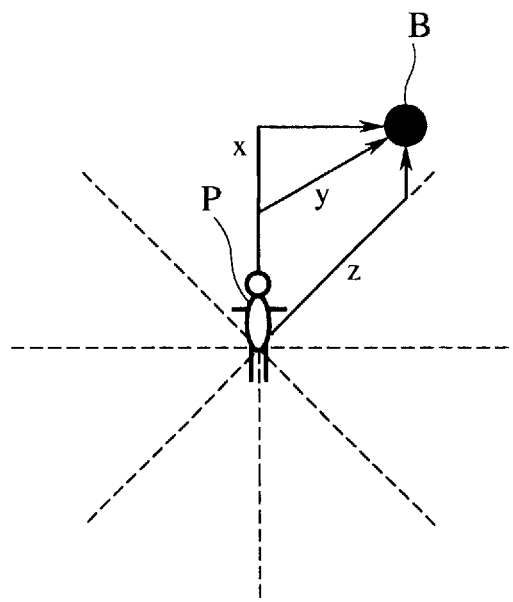
FIG. 15 is an explanatory view of traces of a player moved by the conventional operation by the cross key.
Figure 16:
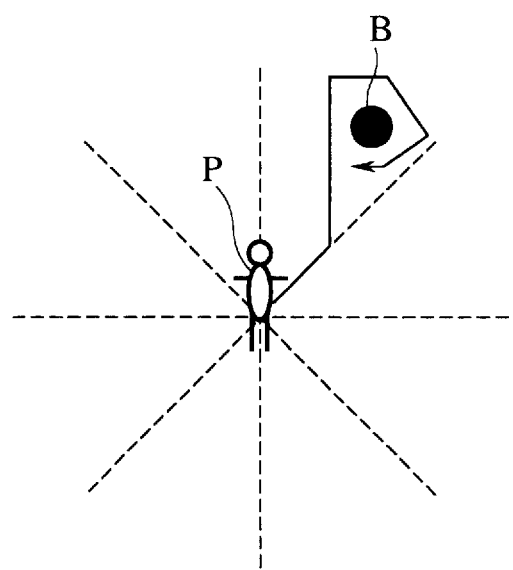
FIG. 16 is an explanatory view of a player being unable to arrive at the ball by the conventional operation of the cross key.

Thus, based on input information "a" for moving a player P, which is inputted by the cross key 18, an intended input direction for moving the player P is judged, whereby the player can be moved in a direction corresponding to the intended direction on a game display. Accordingly even when a game player is not sufficiently skilled, he can move players P in his intended directions without a player P going around the ball B and failing to arrive at the ball B. (see FIG. 16). On the other hand, a skilled game player does not need complicated operations for changing direction (see FIG. 15) and can concentrate on the game by using better operationality.

That is, optimum input directions divided in more than 8 directions are judged based on movement conditions in the form of input information, the input information can be converted to the optimum input directions. The conversion of the input information simulates 32 input information, based on only 8 directions inputted by the cross key 18. The conversion of the input information is not conducted essentially on input information inputted by the cross key 18 but may be conducted on input information inputted by, e.g., a mouse, a joy stick or others.

The present invention is not limited to the above-described embodiment and can include other modifications and variations. For example, the game machine may include the cross key and the display device integrated therewith.

In the image processing steps, the step for computing a corresponding direction for an object to be moved may follow the step for computing an input direction for the object to be moved, based on input information by the information input unit, or vice versa.

In the image processing steps, the step for computing an input direction of a display object which is an object to be moved may follow the step for computing an input direction of the display object which is to be an object to be moved, based on input information by the information input unit, or vice versa.

It is preferred that a unit angle α is divided into angles which are smaller than 1/16 or 1/64 of 360 degrees on the game screen, or a unit angle of an angle of input information α.

The prescribed range may be arbitrarily set as long as the range does not include input directions adjacent to a corresponding direction of an input direction. Depending on the setting, different standards for converting an input direction to a corresponding direction can be obtained.

It is possible that corresponding directions and input directions are displayed at an angle having a set relationship with the field 19 displayed on the game machine. By displaying input directions and corresponding directions at an absolute angle on the field 19, whereby a game player can input directions as watched even when a display direction of the filed 19 is changed to be upside-down or leftside-right.

INDUSTRIAL APPLICABILITY

The present invention is suitable for video game devices for playing games by the use of monitor screens, especially for game devices for playing sports games which are played using teams, moving balls, etc. by a game player operating a plurality of players displayed on monitor screens.

We claim:

1. An image processing method for displaying objects-to-be-moved and a target, comprising the steps of:

computing a plurality of object-to-be-moved directions from the target to a plurality of the objects-to-be-moved, based on coordinates of said plurality of the objects-to-be-moved and coordinates of the target;

computing an input direction for the target to be moved in, based on input information from an information input unit; and comparing said plurality of object-to-be-moved directions with the input direction to select one of said plurality of the objects-to-be-moved whose associated object-to-be-moved direction is included in a prescribed range based on an opposite direction to the input direction.

2. An image processing method according to claim 1, wherein when plural ones of the objects-to-be-moved are in the prescribed range, one of the plural ones in the prescribed range which has a shortest distance with respect to the target is selected.

3. An image processing method according to claim 1 or 2, wherein the prescribed range is a range which is expanded on both sides of the opposite direction of the input direction over an angle smaller than a unit angle of the input direction inputted by the information input unit.

4. An image processing method according to any one of claims 1 to 2, wherein a unit angle of the object-to-be-moved directions is smaller than the unit angle of the input direction inputted by the information input unit.

5. An image processing unit according to claim 4, wherein
the unit angle of the input direction is 1/8 of 360 degrees which is 45 degrees; and the unit angle of the directions for the objects-to-be-moved in is 1/32 of 360 degrees which is 11.25 degrees.

6. An image processing method according to claim 5, wherein the prescribed range is a range which is extended on both sides of an opposite direction to the input direction over 33.75 degrees which is three unit angles of the input direction.

7. An image processing method according to claim 4, wherein standard directions for the object-to-be-moved directions and the input direction are set based on an image of a field displayed together with the objects-to-be-moved and the target.

8. An image processing method according to claim 5, wherein standard directions for the object-to-be-moved directions and the input direction are set based on an image of a field displayed together with the objects-to-be-moved and the target.

9. An image processing method according to claim 6, wherein standard directions for the object-to-be-moved directions and the input direction are set based on an image of a field displayed together with the objects-to-be-moved and the target.

10. An image processing method according to any one of claims 1 to 2, wherein standard directions for the object-to-be-moved directions and the input direction are set based on an image of a field displayed together with the objects-to-be-moved and the target.

11. An image processing device for displaying objects-to-be-moved and a target, comprising:

an object-to-be-moved direction computing unit for computing a plurality of object-to-be-moved directions from the target to a plurality of the objects-to-be-moved, based on coordinates of said plurality of the objects-to-be-moved and coordinates of the target;

an input direction computing unit for computing an input direction for the target to be moved in, based on input information from an information input unit; and an object-to-be-moved selection unit for comparing said plurality of the object-to-be-moved directions with the input direction to select one of said plurality of the objects-to-be-moved whose associated object-to-be-moved direction is included in a prescribed range based on an opposite direction to the input direction.

12. An image processing device according to claim 11, wherein the object-to-be-moved selecting unit selects one of plural ones in the prescribed range which has a shortest distance with respect to the target is selected when the plural ones of the objects-to-be-moved are in the prescribed range.

13. An image processing device according to claim 11, or 12, wherein the object-to-be-moved selecting unit selects sets the prescribed range at a range which is extended on both sides of the opposite direction of the input direction over an angle smaller than a unit angle of the input direction inputted by the information input unit.

14. An image processing device according to claim 13, wherein the object-to-be-moved direction computing unit sets a unit angle of the object-to-be-moved directions to be smaller than the unit angle of the input direction inputted by the information input unit.

15. An image processing device according to claim 13, wherein standard directions for the object-to-be-moved directions and the input direction are set based on an image of a field displayed together with the objects-to-be-moved and the target.

16. An image processing device according to any one of claims 11 to 13, wherein the object-to-be-moved direction computing unit sets a unit angle of the object-to-be-moved directions to be smaller than the unit angle of the input direction inputted by the information input unit.

17. An image processing device according to claim 16, wherein standard directions for the object-to-be-moved directions and the input direction are set based on an image of a field displayed together with the objects-to-be-moved and the target.

18. An image processing device according to claim 16, wherein the unit angle of the input direction is 1/8 of 360 degrees which is 45 degrees; and the unit angle of the directions for the objects-to-be-moved in is 1/32 of 360 degrees which is 11.25 degrees.

19. An image processing device according to claim 18, wherein standard directions for the object-to-be-moved directions and the input direction are set based on an image of a field displayed together with the objects-to-be-moved and the target.

20. An image processing device according to claim 18, wherein the object-to-be-moved selecting unit sets the prescribed range at a range which is extended on both sides of an opposite direction to the input direction over 33.75 degrees which is three unit angles of the input direction.

21. An image processing device according to claim 20, wherein standard directions for the object-to-be-moved directions and the input direction are set based on an image of a field displayed together with the objects-to-be-moved and the target.

22. An image processing device according to any one of claims 11 to 12, wherein standard directions for the object-to-be-moved directions and the input direction are set based on an image of a field displayed together with the objects-to-be-moved and the target.

23. An image processing method for displaying objects-to-be-moved and a target, comprising the steps of:

computing target directions from the objects-to-be-moved to the target, based on coordinates of the objects-to-be-moved and coordinates of the target;

computing an input direction for moving the objects-to-be-moved in, based on input information from an information input unit; and converting the input direction to the target direction when an offset angle between the input direction and the target direction is within a prescribed range.

24. An image processing method according to claim 23, wherein the prescribed range is extended on both sides of the target direction over an angle smaller than a unit angle of the input direction inputted by the information input unit.

25. An image processing method according to claim 23 or 24, wherein
a unit angle of the target direction is smaller than the unit angle of the input direction inputted by the information input unit.

26. A processing method according to claim 25, wherein
standard directions for the target directions and the input direction are set based on a field image displayed together with the objects-to-be-moved and the target.

27. An image processing method according to claim 25, wherein
the unit angle of the input direction is ⅛ of 360 degrees which is 45 degrees; and
the unit angle of the target direction is 1/32 of 360 degrees which is 11.25 degrees.

28. A processing method according to claim 27, wherein
standard directions for the target directions and the input direction are set based on a field image displayed together with the objects-to-be-moved and the target.

29. An image processing method according to claim 27, wherein
the prescribed range is extended on both sides of the target direction over 33.75 degrees, three unit angles of the input direction.

30. A processing method according to claim 29, wherein
standard directions for the target directions and the input direction are set based on a field image displayed together with the objects-to-be-moved and the target.

31. A processing method according to any one of claims 22 to 24, wherein
standard directions for the target directions and the input direction are set based on a field image displayed together with the objects-to-be-moved and the target.

32. An image processing device for displaying objects-to-be-moved and a target, comprising:
a target direction computing unit for computing target directions from the objects-to-be-moved to the target, based on coordinates of the objects-to-be-moved and coordinates of the target;
an input direction computing unit for computing an input direction for moving the objects-to-be-moved in, based on input information from an information input unit; and
an input direction converting unit for converting the input direction to the target direction when an offset angle between the input direction and the target direction is within a prescribed range.

33. An image processing device according to claim 32, wherein
the input direction converting unit sets the prescribed range on both sides of the target direction over an angle smaller than a unit angle of the input direction inputted by the information input unit.

34. An image processing device according to claim 32 or 33, wherein
the target direction computing unit sets a unit angle of the target direction to be smaller than the unit angle of the input direction inputted by the information input unit.

35. A processing device according to claim 34, wherein
standard directions for the target directions and the input direction are set based on a field image displayed together with the objects-to-be-moved and the target.

36. An image processing device according to claim 34, wherein
the unit angle of the input direction is ⅛ of 360 degrees which is 45 degrees; and
the unit angle of the target direction is 1/32 of 360 degrees which is 11.25 degrees.

37. A processing device according to claim 36, wherein
standard directions for the target directions and the input direction are set based on a field image displayed together with the objects-to-be-moved and the target.

38. An image processing device according to claim 36, wherein
the prescribed range is extended on both sides of the target direction over 33.75 degrees, three unit angles of the input direction.

39. A processing device according to claim 38, wherein
standard directions for the target directions and the input direction are set based on a field image displayed together with the objects-to-be-moved and the target.

40. A processing device according to any one of claims 32 to 33, wherein
standard directions for the target directions and the input direction are set based on a field image displayed together with the objects-to-be-moved and the target.

* * * * *